3,037,337
PURIFICATION OF BORON TRICHLORIDE
David M. Gardner, Dover, N.J., assignor, by mesne assignments, to Thiokol Chemical Corporation, a corporation of Delaware
No Drawing. Filed Sept. 6, 1955, Ser. No. 532,749
2 Claims. (Cl. 55—55)

This invention relates to an improved process for the purification of boron trichloride. More particularly, it relates to the removal of phosgene and chlorine from boron trichloride.

Boron trichloride ($BCl_3$) is a gas at ordinary temperatures, having a boiling point of about 18° C. It can be prepared by passing chlorine over mixtures of boron oxide and carbon heated to elevated temperatures approximating 1000 to 1200° C. The chloridizing reaction results in the formation of boron trichloride and a relatively large volume of carbon monoxide in accordance with the equation:

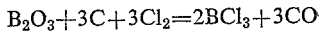

$$B_2O_3 + 3C + 3Cl_2 = 2BCl_3 + 3CO$$

This reaction is exceedingly difficult to control and the effluent gases usually contain free chlorine and phosgene as well as boron trichloride and carbon monoxide. On condensing this mixture of gases at temperatures approximating —10° C., the boron trichloride and the phosgene, which have closely similar boiling points, collect in the liquid phase and this liquid phase has a relatively high solubility for the free chlorine present in the gas mixture. The dissolved chlorine and phosgene are not readily removed by selective vaporization. The crude product is useful for some purposes, but for many uses the chlorine and phosgene interfere. Thus it is necessary to provide a method for the purification of crude boron trichloride, particularly with respect to chlorine and phosgene.

The process of the present invention comprises passing gaseous boron trichloride contaminated with phosgene and/or chlorine in contact with activated alumina at temperatures of about 325 to 550° C. Generally a temperature of about 325° C. appears to be sufficient to remove substantially all of the chlorine and phosgene contaminants. The treatment can be carried out by passing the impure gas through a bed of activated alumina maintained in the specified temperature range. The bed of alumina can be contained in a column, pipe or other suitable chamber. Alternatively a fluidized bed of alumina can be used.

The effluent gas comprising principally boron trichloride also contains some aluminum chloride and more volatile contaminants, for example, carbon dioxide. The gas mixture is advantageously passed through a cooler zone to condense aluminum chloride from the gas stream. The boron trichloride is advantageously recovered by condensing it to a liquid, conveniently at —80° C., and removing the more volatile contaminants by pumping until the vapor pressure of the liquid corresponds to that of pure boron trichloride. This is 3.3 mm. at —80° C.

It is an advantage of the process of the present invention that the method is effective for the purification of commercial quantities of boron trichloride. The starting materials and condition of operation allow easy handling of materials and simple design of apparatus. The activated alumina is readily available at low cost.

*Example I*

Technical grade boron trichloride containing 2.8 mole percent of phosgene and small proportions of chlorine was passed at about 700 mm. Hg pressure at a rate of about 10 ml. of gas per second through a tube having an inside diameter of about 20 millimeters and a length of 30 centimeters packed with activated alumina having a mesh size of 8 to 12 (U.S. Standard) maintained at 354° C. Aluminum chloride condensed in the cooler part of the tube. The exit gas was cooled to —80° C. and collected as a liquid. Dissolved gases were removed by reducing the pressure on the liquid at this temperature and allowing it to come to equilibrium. The process was repeated until the vapor pressure corresponded to 3.3 millimeters at —80° C. The infrared spectrum showed the absence of phosgene bands at 5.5 microns and 11.7 to 11.9 microns which appeared in the spectrum of the unpurified boron trichloride. The product was colorless indicating the absence of dissolved chlorine.

We claim:
1. A method for the treatment of impure boron trichloride containing at least one of the materials chlorine and phosgene as impurities to provide a boron trichloride product containing readily separable more volatile contaminants which comprises contacting the impure boron trichloride in vapor phase with activated alumina at a temperature of about 325° C. to 550° C. and recovering a gaseous boron trichloride product containing readily separable more volatile contaminants.
2. In the process of claim 1, the step of condensing the boron trichloride product containing readily separable more volatile components, and vaporizing the more volatile components to provide a boron trichloride liquid product purified with respect to phosgene and chlorine.

References Cited in the file of this patent
UNITED STATES PATENTS

| | | |
|---|---|---|
| 2,097,482 | Weber | Nov. 2, 1937 |
| 2,369,214 | Cooper | Feb. 13, 1945 |

OTHER REFERENCES

Mellor: "Comprehensive Treatise on Inorganic and Theoretical Chemistry," vol. 5, page 270 (1924), Longmans, Green & Co., N.Y.C.